Jan. 26, 1960

W. S. MORTLEY 2,922,966

ULTRASONIC DELAY DEVICES

Filed Nov. 12, 1954

Inventor:
Wilfrid Sinden Mortley
By his attorneys:
Baldwin & Wight

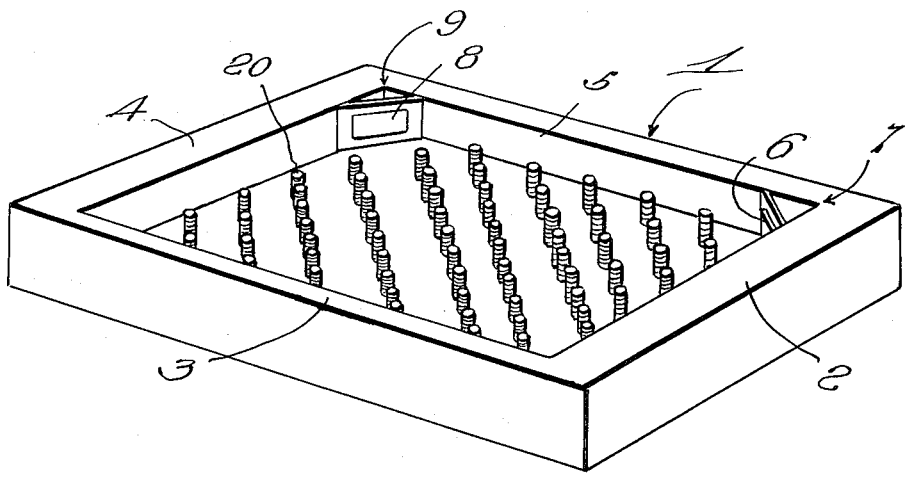
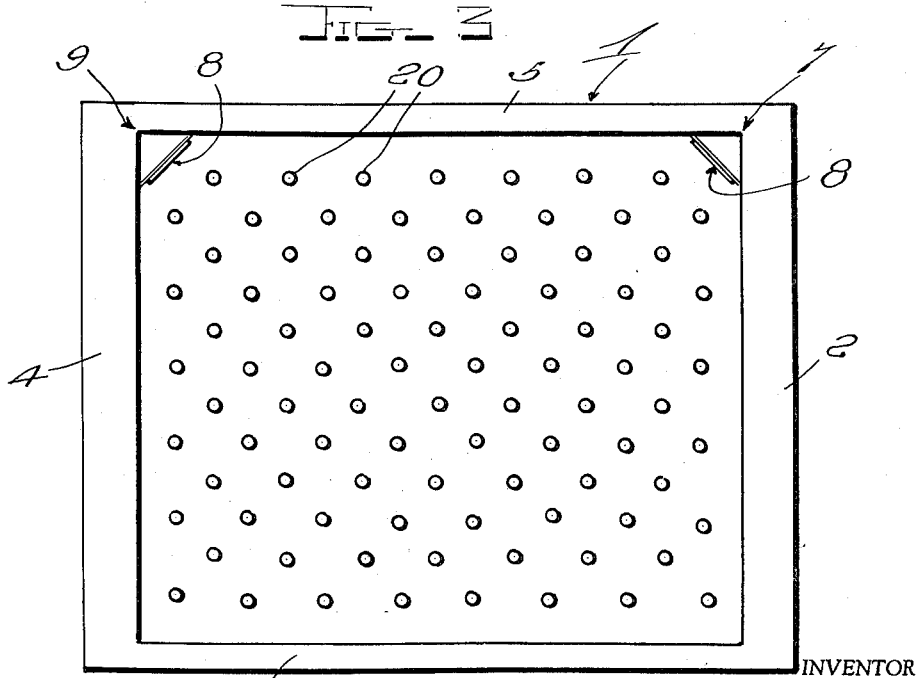

United States Patent Office 2,922,966
Patented Jan. 26, 1960

2,922,966
ULTRASONIC DELAY DEVICES

Wilfrid Sinden Mortley, Great Baddow, England, assignor to Marconi's Wireless Telegraph Company Limited, London, England, a British company Application November 12, 1954, Serial No. 468,517

Claims priority, application Great Britain November 30, 1953

1 Claim. (Cl. 333—30)

This invention relates to devices which delay ultrasonic electric signals by employing a transducer to convert the said electric signals into mechanical signals, i.e. a beam of elastic waves, and then directing them over a predetermined path, after which they are reconverted into electric signals. These reconverted ultrasonic signals are consequently delayed in time with respect to the original ultrasonic signals.

In the known delay devices or delay cells the converted ultrasonic signals are arranged to travel through a fluid or solid medium. The maximum time delay obtainable is dependent upon the maximum available path length over which the elastic waves travel, and in a particular medium the maximum path length is concerned with the degree of absorption by the medium, spreading of the beam of elastic waves, signal strength, band width, and structural limitations arising from the dimensions of the cell, which may be 15 to 20 feet in length.

To reduce the dimensions of the cell, it has been proposed to reflect the elastic waves by the introduction of reflectors.

In order to produce relatively small delay cells it has been further proposed to arrange the cells so that they reflect the elastic waves in a criss-cross fashion (i.e. so that the waves follow a zig-zag path), the arrangement being such that the waves traverse each part of the medium twice, in mutually perpendicular directions, during their passage through the cell. This arrangement has been achieved by using a rectangular container in the case of a fluid medium, or a rectangular block of the medium in the case of a solid medium.

To obtain the desired zig-zag path the dimensions of the container or block are chosen such that the angle of incidence upon each of the reflecting surfaces is always approximately 45 degrees, this angle being such that there is total internal reflection within the media generally employed in delay cells (for example, mercury in a glass container or fused quartz in air).

It is further known that, for optimum use of the medium through which the beam of elastic waves travels, the length of each of the reflecting surfaces must be integral multiples of the width of the beam of elastic waves divided by $\sqrt{2}$, together with the condition that the multiples must not have an integral common factor other than unity. If a container or block is constructed in accordance with the above conditions, the elastic wave beam will then traverse each zone of the medium twice in mutually perpendicular directions, with the wave travelling from one corner of the container or block to another corner at the far end of an adjacent side that is associated with the even integral multiples. In a cell constructed with two transducers, each of which is positioned across one or other of two adjacent corners of the rectangle formed by the reflecting walls of the cell, the effective length and width of the cell are respectively $m/\sqrt{2}$ and $n/\sqrt{2}$ where $m$ and $n$ are integers (the integer, $m$ or $n$ as the case may be, in the dimension between the two transducers must always be even) the beam undergoes $m+n-2$ reflections between the above mentioned corners, giving a path length of $(mn-1)$ beam widths.

Although a container or block constructed in accordance with the above factors enables the maximum path length, for a particular cross-section of beam and volume of medium to be obtained, the cell will also transmit spurious signals which are produced by waves travelling along paths other than the preferred path. The paths along which the spurious signals travel may be shorter than the preferred maximum path length. Consequently, in view of the smaller attenuation produced over the shorter path length, the spurious signals may be greater than that of the desired signal.

It is the object of the present invention to reduce the effect of spurious signals travelling by paths other than the intended path.

According to the present invention there is provided an ultrasonic delay device having a transmitting and a receiving transducer separated by a preferred path for elastic waves, wherein the preferred path for a beam of elastic waves is flanked on each side by a zone which includes wave energy dissipating means so that if a beam remains truly parallel in travelling said path it avoids said zones, but if the beam departs from its parallel form the undesired parts thereof are subject to the effects of said energy dissipating means.

For a better understanding of the invention, and to show how the same may be carried into effect, reference will now be made to the accompanying drawings in which:

Fig. 2 is a perspective view of a liquid filled cell; and

Fig. 3 is a plan view of the same cell.

Figure 1:
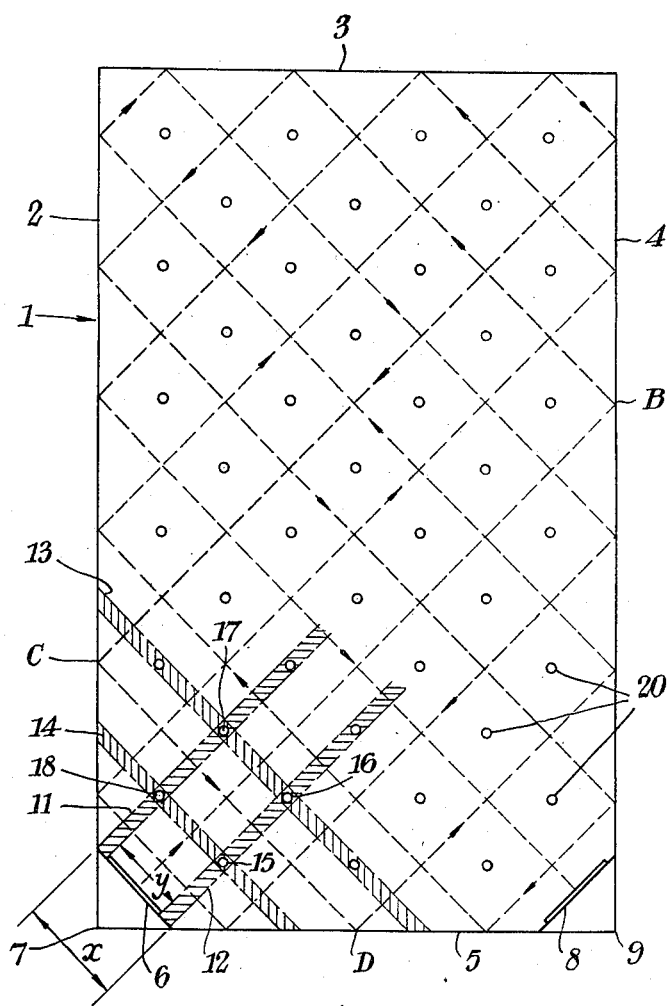
Fig. 1 shows diagrammatically the path of a beam of elastic waves through a cell.

The delay device for the purpose of this description will be regarded as a liquid-filled delay cell, although the description would apply equally well to a cell employing solid or gaseous media.

The device shown in Figs. 1, 2 and 3 comprises a rectangular container 1 having walls 2, 3, 4 and 5 respectively. The inner surfaces of the walls serve as reflectors for the beam of elastic waves. An input transducer 6 is situated across the inside of the junction 7 of the walls 2 and 5. A second transducer 8 is likewise located at the junction 9 of walls 4 and 5. The transducer 6 is used for converting the ultrasonic electric signals into a beam of elastic waves, the transducer 8 being used for reconverting the elastic waves into ultrasonic electric signals. The length of the adjacent pairs of walls (for example, walls 2 and 3) are such that integers defined hereinbefore are thirteen and eight respectively. The directions of the beams of waves emitted from transducer 6 are shown as dotted lines in the figure. The beams travel through the medium from transducer 6 to the transducer 8, along a path which is indicated by the direction of the arrows marked on the dotted lines. The width of the beam of elastic waves is normally equal to the width $x$ of the emitting or receiving surface of the transducers. However, in the present embodiment the beam width has been slightly reduced by the presence of the collimating posts 20, below the value used for determining the dimensions of the walls of the delay cell, the amount of reduction being 20% so as to give a beam width indicated at $y$ in the figure. The beam still traverses the cell as indicated in the figure, but as the beam width (considered to be parallel throughout the path) is slightly less than the maximum permitted value, the beam is flanked on each side by a narrow strip of medium, shown in the figure as shaded strips 11, 12 for beam A to B or 13 and 14 for beams C to D, these strips remaining unaffected during the passage of the narrow beam through the medium. These shaded strips represent ultrasonic shadows which are caused by the presence of the collimating posts.

At the regions where the narrow strips cross over (for example points 15, 16, 17 and 18 in Fig. 1) collimating posts 20 are positioned such that their axes are parallel to the surfaces of the reflecting walls. These posts appear in the drawings as small circles $o$ and extend vertically upward to heights substantially equal to the heights of the walls of the container. The collimating posts 20 introduce zones or discontinuities in the medium which are capable of dispersing and/or absorbing energy from any elastic wave falling thereon.

In the case of a solid medium these collimating posts would be equivalently replaced by holes formed in the actual material of the block. In any media it may not be desirable to introduce collimating posts at every crossover position, since if a condition arises due to some particular posts or holes such that the elastic wave energy is reflected by them directly into transducer 6, it may be better to omit these particular holes or posts.

Provided that the beam remains parallel throughout the whole of its path through the cell, the collimating posts do not affect the beam. If the beam diverges, that is, spreads sideways, the collimating posts will intercept the portions of the beam which have diverged and disperse them, the net result being that no appreciable amount of energy travels through the cell by an undesired path.

The collimating posts 20 may be formed from various materials and may also be of differing shapes. The surfaces of the collimating posts are preferably roughened or corrugated in order to disperse or dispersively reflect energy in directions other than those in which the beam proceeds. It has been found that steel screws as shown in Fig. 2 are suitable for use with a mercury medium. In the case of solid media, the holes serving as collimating posts are preferably left roughened, and they may, if desired, be filled with an ultrasonic absorbing medium.

In an experimental tested embodiment generally as described above using mercury as the medium but wherein $m$ and $n$ were thirteen and sixteen respectively, it was found that the signal strengths of the unwanted signals were 50 decibels below the signal strength of the beam travelling along the desired path.

Spurious signals may be further reduced by preventing reflections from the bottom or top of the container by forming ridges in the surfaces thereof or in the case of a solid block of medium, the same effect may be produced by forming grooves or cavities in the top and bottom surfaces thereof.

I claim:

An ultrasonic delay device comprising a container having rectangular inner containing walls each provided with reflecting surfaces, a liquid medium contained within said walls, a transmitting transducer positioned in one corner of said container at an angle to said walls so that the transmitted waves follow a preferred path through said medium, said path including a plurality of reflections from said reflecting walls, a receiving transducer positioned in an adjacent corner of said container at an angle to said walls and at the end of said preferred path, a plurality of dispersively reflecting members located in spaced positions in lineal rows along each side of the preferred paths of waves within said container and extending vertically upwardly to heights substantially equal to the heights of the walls of the container so as to define said paths and to constitute energy dispersing means whereby, if a beam of waves departs from its parallel form, the undesired parts thereof are subject to dispersion by said members, and wherein said members are constituted by cylindrical collimating posts each having transverse sections substantially less than the width of the transmitted beam of waves.

References Cited in the file of this patent
UNITED STATES PATENTS

| | | |
|---|---|---|
| 2,263,902 | Percival | Nov. 25, 1941 |
| 2,505,364 | McSkimin | Apr. 25, 1950 |
| 2,565,725 | Frederick et al. | Aug. 28, 1951 |
| 2,685,067 | Beveridge et al. | July 27, 1954 |
| 2,826,745 | Page | Mar. 11, 1958 |